United States Patent
Zohar et al.

(10) Patent No.: US 8,782,176 B2
(45) Date of Patent: Jul. 15, 2014

(54) SYNCHRONIZED VIDEO SYSTEM

(75) Inventors: Ofir Zohar, Tel Aviv (IL); Matan Arazi, Tel Aviv (IL); Itsik On, Tel Aviv (IL); Liran Zvibel, Tel Aviv (IL); Avner Braverman, Tel Aviv (IL)

(73) Assignee: Fusic Ltd., Tel Aviv (IL)

( * ) Notice: Subject to any disclaimer, the term of this patent is extended or adjusted under 35 U.S.C. 154(b) by 180 days.

(21) Appl. No.: 13/444,858

(22) Filed: Apr. 12, 2012

(65) Prior Publication Data

US 2012/0265859 A1 Oct. 18, 2012

Related U.S. Application Data

(60) Provisional application No. 61/475,296, filed on Apr. 14, 2011.

(51) Int. Cl.
*G06F 15/16* (2006.01)
*H04N 5/272* (2006.01)

(52) U.S. Cl.
USPC .......................................... 709/219; 348/722

(58) Field of Classification Search
CPC ......... G06F 15/16; G09B 19/00; H04N 5/272
USPC ............................. 709/219; 434/307; 345/723
See application file for complete search history.

(56) References Cited

U.S. PATENT DOCUMENTS

| | | | |
|---|---|---|---|
| 7,593,061 B2 * | 9/2009 | Baumgartner | 348/515 |
| 7,821,574 B2 | 10/2010 | Black | |
| 2003/0049591 A1 * | 3/2003 | Fechter | 434/307 A |
| 2003/0218626 A1 * | 11/2003 | Greene | 345/723 |
| 2005/0042591 A1 | 2/2005 | Bloom et al. | |
| 2007/0276670 A1 * | 11/2007 | Pearlstein | 704/270 |
| 2009/0141032 A1 * | 6/2009 | Nguyen et al. | 345/501 |
| 2010/0031149 A1 * | 2/2010 | Gentile et al. | 715/723 |
| 2010/0211876 A1 | 8/2010 | Fountaine | |
| 2011/0008017 A1 * | 1/2011 | Gausereide | 386/280 |
| 2011/0082804 A1 * | 4/2011 | Swinson et al. | 705/306 |

FOREIGN PATENT DOCUMENTS

| | | | | |
|---|---|---|---|---|
| EP | 2337018 | * | 11/2009 | G10H 1/36 |
| EP | 2337018 | * | 6/2011 | |

* cited by examiner

*Primary Examiner* — Kevin Bates
*Assistant Examiner* — Chen-Liang Huang
(74) *Attorney, Agent, or Firm* — D. Kligler I.P. Services Ltd.

(57) ABSTRACT

A method for media processing includes providing a source media clip, which includes at least source audio data, via a network to a client device. A media recording, including client video and client audio data recorded by a user of the client device while playing the source audio data, is received via the network from the client device. The received media recording is synchronized with the source media clip and is mixed with the source media clip to generate a mixed media clip. The mixed media clip is transmitted to client devices over the network for playback by users of the client devices.

13 Claims, 5 Drawing Sheets

SYNCHRONIZED VIDEO SYSTEM

CROSS-REFERENCE TO RELATED APPLICATIONS

This application claims the benefit of U.S. Provisional Patent Application 61/475,296, filed Apr. 14, 2011, which is incorporated herein by reference.

FIELD OF THE INVENTION

The present invention relates generally to media processing, and particularly to synchronization and mixing of video and audio streams.

BACKGROUND

Various methods and systems for synchronizing and mixing video and audio media are known in the art. For example, to make a music video clip, professional recording studios commonly record different video and sound tracks at different times and then overlay and intercut them to create the final product. Systems of this sort use costly, specialized equipment, under the control of expert operators.

A number of methods have been suggested for simplifying the mixing of video and audio media from different sources. For example, U.S. Patent Application Publication 2010/0211876, whose disclosure is incorporated herein by reference, describes systems and methods for casting calls. A casting call is generated based on information provided by an individual (e.g., a casting call manager). The casting call may indicate a particular video clip and designates a recipient for submissions related to the casting call. A user interested in participating in the casting call may submit a query. In response to the query, the user is provided with access to the video clip for modification. Such a modification may involve incorporating a recording of a performance into the video clip. As a result, the modified video clip may be generated whereby the user becomes the "actor" in the modified video clip.

As another example, U.S. Patent Application Publication 2005/0042591, whose disclosure is incorporated herein by reference, describes methods and apparatus for use in sound replacement with automatic synchronization to images. Digital audio and video files are created corresponding to selected scenes from a creative production and are provided with a processing system that enables dialog to be selected from a scene and replaced by a user's dialog, which is automatically synchronized with the original dialog so as to be in synchronism with lip movements displayed by the accompanying video display. The processing further includes a graphical user interface that presents the user with the video, the text of the dialog, and cues for rehearsal and recording of replacement dialog by the user. Replay of the user's dialog is accompanied by the video and part of the original audio except that the original dialog corresponding to the user's dialog is muted so that the user's dialog is heard as a replacement. Singing or other sounds associated with visible action may also be replaced by the same processes.

U.S. Pat. No. 7,821,574, whose disclosure is incorporated herein by reference, describes a method for synchronizing an audio stream with a video stream. This method involves searching in the audio stream for audio data having values that match a distinct set of audio data values and synchronizing the audio stream with the video stream based on the search. In some embodiments, the distinct set of audio data values is defined by a predetermined distinct tone. In other embodiments, the distinct set of audio data values is defined by audio data contained in the video stream.

SUMMARY

Embodiments of the present invention that are described hereinbelow provide methods, systems and software for synchronizing and mixing media recordings.

There is therefore provided, in accordance with an embodiment of the present invention, a method for media processing, which includes providing a source media clip, including at least source audio data, via a network to a client device. A media recording, which includes client video and client audio data recorded by a user of the client device while playing the source audio data, is received via the network from the client device. The received media recording is synchronized with the source media clip, and the synchronized media recording is mixed with the source media clip to generate a mixed media clip. The mixed media clip is transmitted to client devices over the network for playback by users of the client devices.

In disclosed embodiments, the source media clip includes music, and the user sings along with the music in the media recording. Typically the music in the source media clip includes a source music video in which a performer sings a song, and mixing the synchronized media includes generating a mixed music video in which the song is sung by both the performer and the user. Generating the mixed music video may include mixing multiple media recordings, received respectively from multiple different users, with the source music video so that the mixed music video includes segments including the multiple different users. In one embodiment, mixing the multiple media recordings includes receiving an input over the network from one of the client devices indicating a selection of one or more of the users for inclusion in the mixed music video, and generating the mixed music video for transmission to the one of the client devices responsively to the selection.

In one embodiment, providing the source media clip includes incorporating at least one Barker audio sequence in the source media clip, and synchronizing the received media recording includes detecting the at least one Barker audio sequence in the received media recording, and aligning the client audio data with the source audio data using the at least one detected Barker audio sequence.

Alternatively or additionally, synchronizing the received media recording includes detecting a residual of the source audio data in the received media recording, and aligning the client audio data with the source audio data using the detected residual. Mixing the synchronized media recording may include canceling the residual of the source audio data from the mixed media clip. In a disclosed embodiment, canceling the residual of the source audio data includes estimating a distortion of the residual relative to the source audio data, and to correct the client audio data using the estimated distortion.

There is also provided, in accordance with an embodiment of the present invention, apparatus for media processing, which includes a memory, which is configured to hold a source media clip, including at least source audio data. A processor is configured to transmit the source media clip via a network to a client device, to receive via the network from the client device a media recording including client video and client audio data recorded by a user of the client device while playing the source audio data, to synchronize the received media recording with the source media clip, to mix the synchronized media recording with the source media clip to generate a mixed media clip, and to transmit the mixed media clip to client devices over the network for playback by users of the client devices.

There is additionally provided, in accordance with an embodiment of the present invention, a computer software product, including a computer-readable medium in which program instructions are stored, which instructions, when read by a computer, cause the computer to provide a source media clip, including at least source audio data, via a network to a client device, to receive via the network from the client device a media recording including client video and client audio data recorded by a user of the client device while playing the source audio data, to synchronize the received media recording with the source media clip, to mix the synchronized media recording with the source media clip to generate a mixed media clip, and to transmit the mixed media clip to client devices over the network for playback by users of the client devices.

The present invention will be more fully understood from the following detailed description of the embodiments thereof, taken together with the drawings in which:

DETAILED DESCRIPTION OF EMBODIMENTS

Overview

Figure 1:
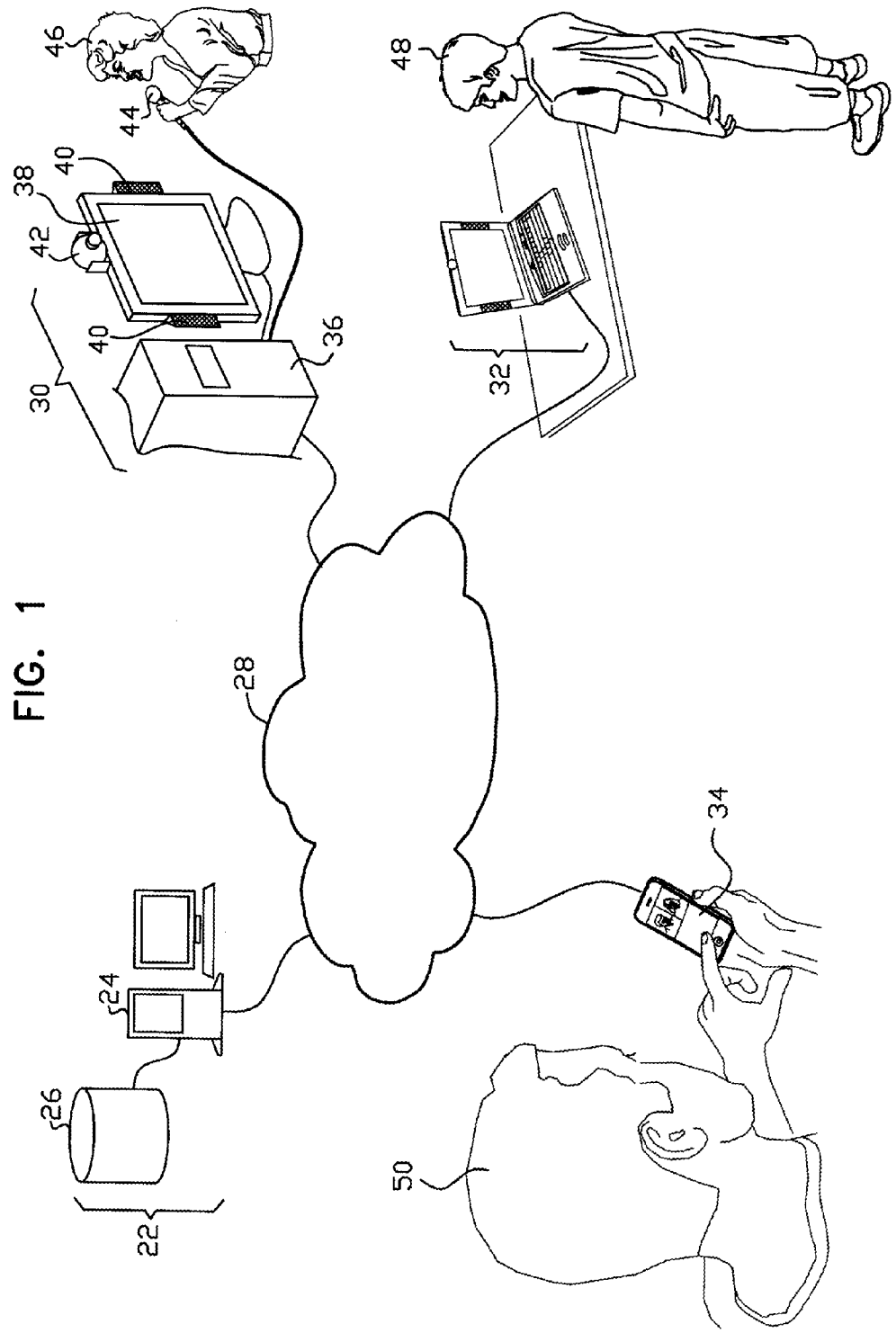
FIG. 1 is a schematic, pictorial illustration of a media recording and distribution system, in accordance with an embodiment of the present invention.

Many music lovers enjoy singing along with recordings of their favorite performers and may imagine themselves as recording stars, sharing the performer's spotlight. Talent shows and recording studios allow fans to bring these wishes closer to reality, but at a high cost in terms of time, money and effort. Media recording software in personal computers and home entertainment consoles allows users to record and edit their own music video clips, which they can then upload to popular Web sites, such as YouTube®. Mixing together audio and video from different sources, however, remains beyond the capabilities of most users and the equipment at their disposal.

Embodiments of the present invention that are described hereinbelow address this unmet need by enabling users to create synchronized media clips simply and automatically. The term "media clip," in the context of the present description and in the claims, refers to a digital recording of audio data, which is typically (although not necessarily) accompanied by video, as well, and is packaged in a form suitable for transmission over a network. In the disclosed embodiments, the media clips have the form of music videos, in which video and audio data recorded by users are mixed with source video and audio data that have been recorded by others, typically (although not necessarily) recording artists. Alternatively, however, the media clips may comprise any suitable sort of media content, such as instrumental music, stage performances in which users take part, or even job interviews in which a user responds to an interviewer's questions.

In the disclosed embodiments, a server transmits a source media clip, comprising source audio data and generally video, as well, via a network to a client device. Typically, the user of the client device chooses the source media clip from a menu of available selections on a Web site maintained by the server. The user plays the source media clip and records his or her own voice and image on the client device at the same time. The recorder program may display the lyrics of the song and color them as the clip recording progresses, thus cuing the user to join in with the singing and reminding him or her of the correct lyrics. Software on the client device automatically uploads this media recording, which comprises the client video and client audio data recorded by the user of the client device while playing the source audio data, to the server. The server synchronizes and mixes the received media recording with the source media clip in order to generate a mixed media clip, in which the user is seen and heard, for example, singing along with the performer of the original source clip (in a "duet"). The server may transmit the mixed media clip to the user who made it, as well as to other client devices for playback by other users.

In some embodiments, the server receives multiple media recordings from multiple different users, and synchronizes each of them with the source music video. The server may then present a mixed music video comprising segments containing different users, appearing sequentially and/or concurrently. The choice of segments and the modes according to which the video images and audio recordings are mixed may be determined by the server, based on predefined rules or random selection. Alternatively or additionally, users may input instructions to the server over the network to indicate their selection of one or more of the recorded users for inclusion in the mixed music video. These instructions may be input in advance or even in real time as the mixed music video is downloaded and played.

Various techniques may be used to synchronize the client media recording with the source media clip. In one embodiment, at least one Barker audio sequence is incorporated in the source media clip. The server then detects this Barker audio sequence in the received media recording and uses it in order to align the client audio data with the source audio data. Optionally, for enhanced synchronization and compensation for clock skew, multiple Barker audio sequences of this sort may be inserted and detected, for example one at the beginning and one at the end of the media clip.

In another embodiment, the server detects a residual of the source audio data in the received media recording and matches the residual to the source audio in order to align the client audio data with the source audio data. The term "residual," in the context of the present description and in the claims, refers to audio signals that are played by the speakers of the client device and are then re-recorded, together with the user's audio input, by the microphone of the client device. This residual is typically distorted, relative to the source audio, due to acoustic and electronic imperfections at the client end, and it can therefore cause disturbing audio effects when mixed with the source audio. To alleviate these effects, the server may cancel at least some of the residual of the source audio data from the mixed media clip. For this purpose, the server may estimate a distortion of the residual relative to the source audio data, and may then correct the client audio data using the estimated distortion.

System Description

FIG. 1 is a schematic, pictorial illustration of a media recording and distribution system 20, in accordance with an embodiment of the present invention. A media server 22 comprises a processor 24 and a memory 26, which stores multiple source media clips. Memory 26 may also store client media recordings that processor 24 has received and synchronized with respective source media clips. Typically, server 22 comprises a suitable general-purpose computer (or a cluster of such computers), which has been programmed in software to carry out the functions that are described herein. This software may be downloaded to the computer in electronic form, over a network, for example. Additionally or alternatively, the software may be stored on tangible, non-transitory computer-readable media, such as magnetic, optical, or electronic memory media.

Server 22 communicates over a network 28 with multiple client devices 30, 32, 34, .... Typically, network 28 comprises the public Internet, and server 22 communicates with the client devices via a suitable Web interface, as is known in the art. Alternatively, the server and clients may communicate using any other suitable sort of network and interfaces.

Client devices 30, 32, 34 may comprise, for example, desktop, laptop, or tablet computers, media consoles, personal digital assistants or smart phones, or any other sort of device with the types of network, video and audio interfaces and computing capabilities needed to interact with server 22. By way of example, client device 30 comprises a computer with a processor 36, video display 38 and speakers 40 for playing media clips, along with a video camera 42 and microphone 44 for recording. Client devices 32 and 34 are similarly equipped, though in different configurations.

In the pictured embodiment, users 46, 48 and 50 download and play a source media clip from server 22 on their respective client devices 30, 32 and 34. These users typically watch the source video on their displays and play the source audio via their speakers, and simultaneously record their own video and audio data using their cameras and microphones. Alternatively, it is sufficient for the users to listen to the source audio as they record, even if they do not see the source video, although it is desirable that the lyrics be displayed in synchronization with the soundtrack, reminding the user when to join in and providing the correct lyrics. Further alternatively, this source audio may be played by a different device (or even from a separate recording of the source media clip in question) while a user records on his or her client device.

Client devices 30, 32 and 34 upload the respective media recordings made by users 46, 48 and 50 via network to server 22. Processor 24 synchronizes the recordings with the source media clip and stores the synchronized versions of the recordings in memory 26. As noted earlier, the synchronization may be based on Barker sequences that are inserted at the beginning and, optionally, the end of the source audio data, such as 11-bit Barker sequences of tones at a suitable frequency, for example 1050 Hz. Processor 24 synchronizes the uploaded audio recordings by detecting the residuals of these Barker sequences in the recordings. Alternatively or additionally, processor 24 may detect residuals of the original source audio itself in the uploaded audio recordings and may then synchronize the recordings by aligning these residuals with the corresponding audio data in the source audio. Any suitable method of pattern matching that is known in the art may be used for this purpose.

Based on this synchronization process, processor 24 generates and, typically, stores synchronization data, such as accurate timestamps, together with the synchronized recordings in order to facilitate subsequent mixing and playback. If the sorts of techniques described in the above-mentioned U.S. Pat. No. 7,821,574 were used in creating the video clips, so that the video and audio streams are indeed synchronized, and it is then necessary only to synchronize the audio streams of the different clips. The same offsets can be used when editing the respective video streams.

Additionally or alternatively, processor 24 may cancel residuals of the source audio from the recorded client audio data. These residuals will have typically undergone nonlinear distortion due to acoustic effects (such as poor sound reproduction by inexpensive speakers and microphones, as well as conversion from stereo playback by speakers 40 to monaural recording by microphone 44) and/or electronic effects (such as clock skew due to lack of synchronization between the internal clock of processor 36 and a USB clock used by microphone 44).

Processor 24 may analyze this distortion by finding one or more segments in the recorded client audio in which the client was not singing, so that the audio data in these segments contain only the residual of the source audio. By comparing this residual with the corresponding source audio, the processor is able to compute the overall nonlinear transformation undergone by the residual. The processor applies the inverse of this transformation to the recorded client audio data, and thus cancels disturbing audio effects that might otherwise arise due to the difference between the residual and the source audio. This sort of transformation is also useful in enhancing the alignment of the client media recordings with the source media clip and with other client recordings that are based on the same clip.

Server 22 produces "mashups" of the source clip with the synchronized client recordings, either autonomously or on request of users 46, 48, 50, .... A typical mashup mixes parts of the audio and video data from the source clip with corresponding parts of one or more synchronized client recordings, by overlaying or interleaving different parts of the source and client recordings. Server 22 may generate these mashups in an off-line process or on-line in response to user input. For example, an operator of server 22 may program the server with an edit description list (EDL), defining video screen layouts and audio effects, and processor 24 may select elements from the EDL either in a predetermined order or in a pseudo-random fashion in order to create the mashup. Users 46, 48, 50, ..., may choose to play mashups prepared by the server, or they may alternatively create their own mashups. For example, user 50 may initially request a mashup of the recording made by user 46 with a given source clip and may then switch in mid-clip to add or substitute the recording made by user 48. Because the recordings have been pre-synchronized and stored by server 22, processor 24 is able to generate and transmit a continuous mashup of this sort on-line in real time.

Software Functions and Interfaces

Figure 2:
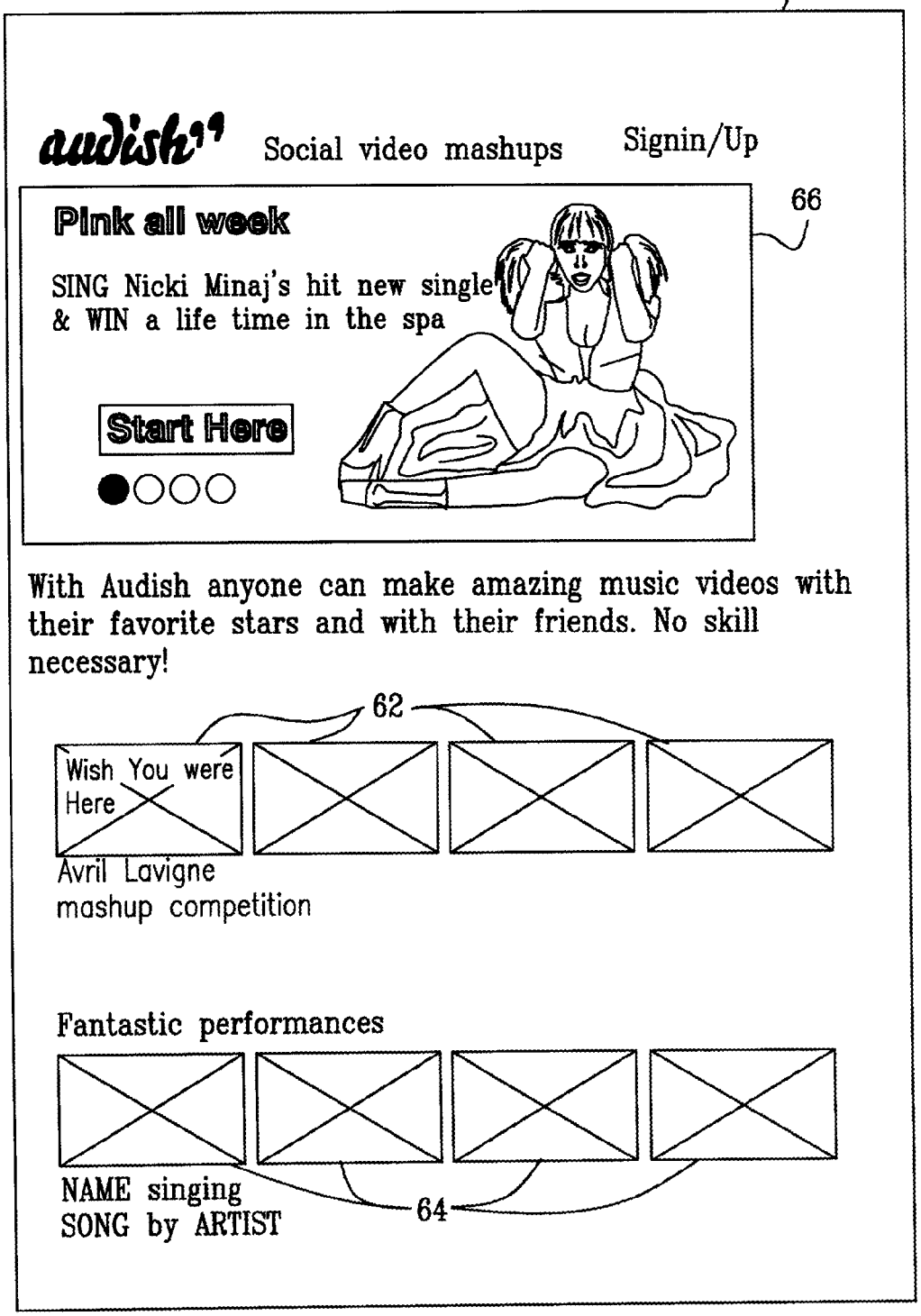
FIGS. 2 and 3 are schematic representations of user interface screens, in accordance with an embodiment of the present invention.

FIG. 2 is a schematic representation of a user interface screen 60 that is transmitted from server 22 to client devices 30, 32, 34, ..., in accordance with an embodiment of the present invention. Server 22 automatically adjusts the screen to the type of client device and the software that it is running. For example, different screen versions may be provided for tablets and other mobile devices, as well as for integration in social networking applications, such as Facebook®.

Screen 60 allows users to select different functions in order to create and/or play mashups. For example, a scrollable strip of "events" 62 lists different source clips that users may choose. When a user selects one of these events, he or she is prompted to play the corresponding source clip and to create and upload a corresponding media recording. A strip of "performances" presents selected mashups that users may choose to download and play, while additional controls (not shown) enable users to access another page on which they can view and generate other mashups. A banner 66 advertises special offers and campaigns, and can be used, for example, to promote particular recording artists and recordings.

Figure 3:
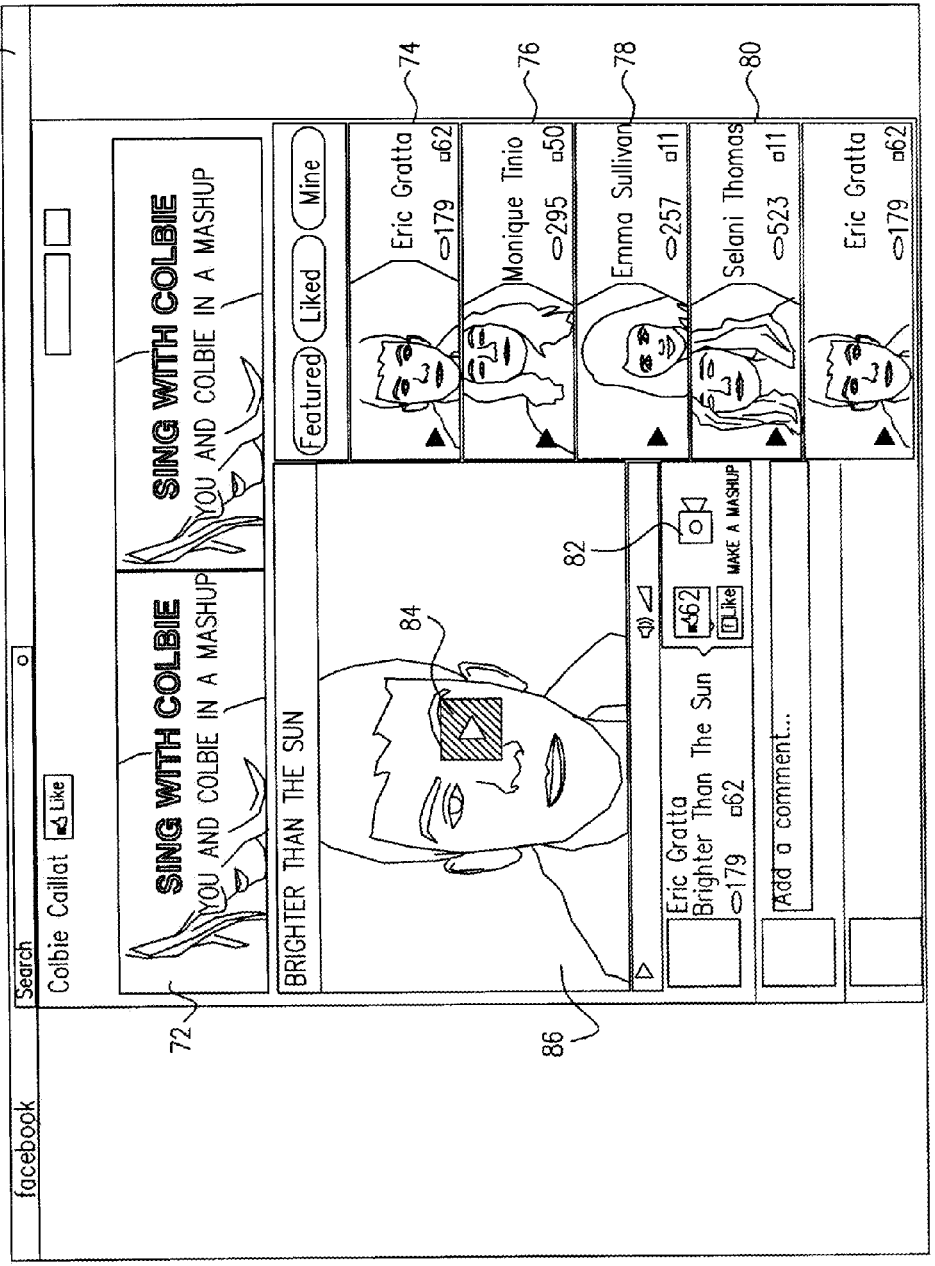

FIG. 3 is a schematic representation of a user interface screen 70 that is transmitted from server 22 to client devices 30, 32, 34, . . . , in accordance with another embodiment of the present invention. This screen may be accessed, for example, when a user clicks on banner 66 to enter or view mashups of a particular performer or source clip, which is promoted in a banner 72 on screen 70. Participants who have already uploaded recordings of the clip in question are displayed on corresponding tabs 74, 76, 78, 80, . . . , on the screen, and a user viewing screen can choose a mashup of one of these participants by selecting the corresponding tab. The mashup will appear in a player region 86 of screen 70 and will play on the client device when the user selects an appropriate start control 84.

A user viewing screen 70 can create his or her own mashup using a mashup control 82. The user may then select one or more of tabs 74, 76, 78, 80, . . . , in order to indicate the participants that he or she would like to include in the mashup and may, optionally, change the participants while the mashup is playing.

Figure 4:
FIG. 4 is a schematic representation of an image in a video mashup, in accordance with an embodiment of the present invention.

FIG. 4 is a schematic representation of an image 90 in a video mashup, in accordance with an embodiment of the present invention. Image 90 combines a picture 92 of the performer of the source clip side-by-side with a picture 94 of a participant who has uploaded a recording of the song in the clip. In this sort of view, the voices of the performer and the participant are typically overlaid in the mixed audio. Alternatively, the voices of the performer and the participant may be interleaved, with various sort of audio fade or dissolve between the performer and participant segments. Furthermore, pictures 92 and 94 may appear in different on-screen formats, such as picture-in-picture or superimposed images, with various sorts of video dissolve between the pictures, as well as in three-dimensional effects. As noted earlier, server 22 creates these audio and video effects automatically, typically using pre-programmed EDL elements, which are selected automatically or, in some cases, on user command.

Figure 5:
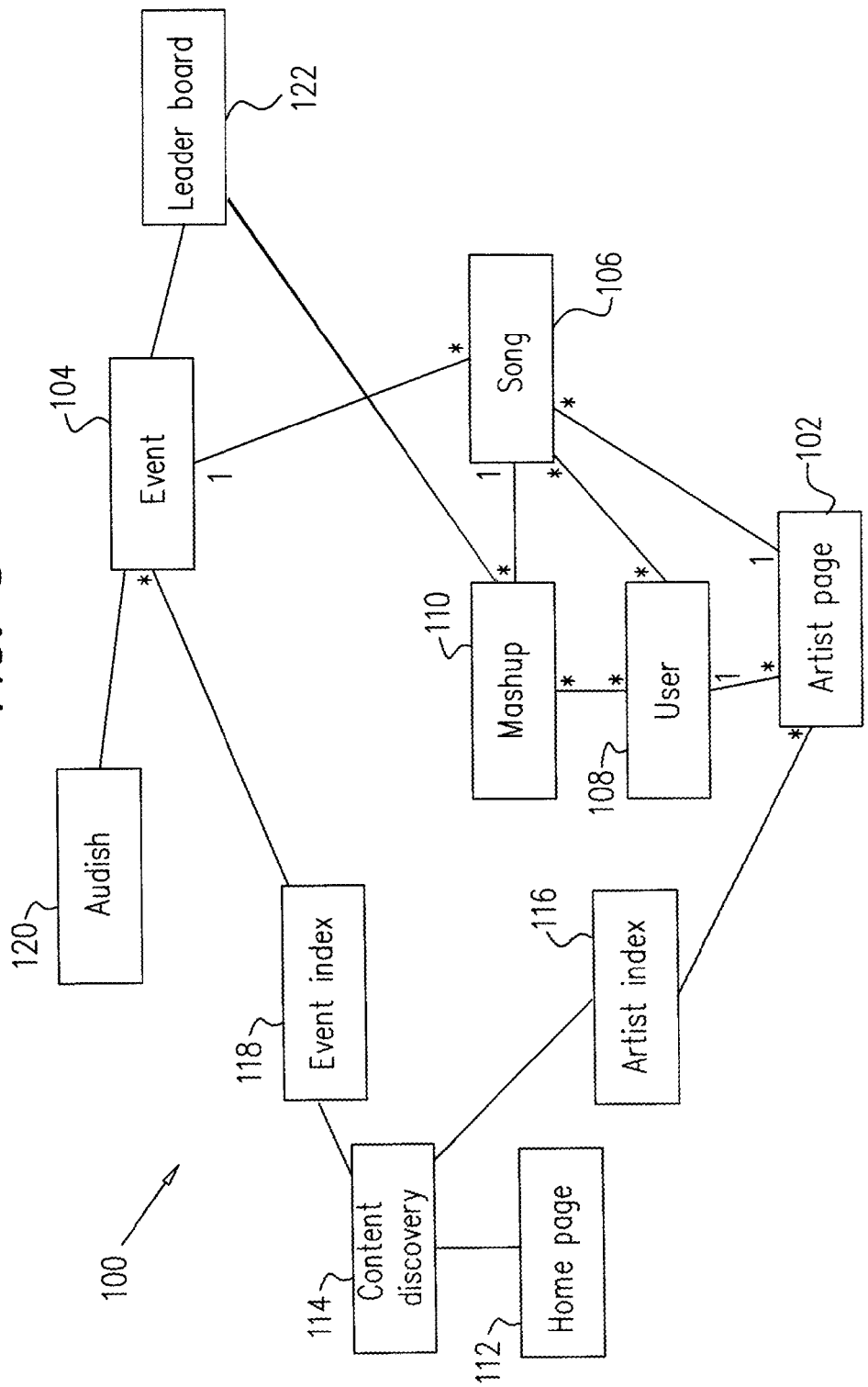
FIG. 5 is a block diagram that schematically illustrates data structures used in a system for synchronized media recording and playback, in accordance with an embodiment of the present invention.

FIG. 5 is a block diagram that schematically illustrates a set 100 of data structures that are maintained and used by server 22, in accordance with an embodiment of the present invention. The data structures have the following functions:

An artist page 102 is associated with each performer who has one or more source video clips available for distribution by server 22.

An event object 104 is associated with each source clip or campaign (which may include multiple source clips) that is presented to users of server 22.

A song object 106 is associated with each song and corresponding source clip. As shown in the figure, each artist page 102 may point to multiple song objects, as may each event object 104.

A user object 108 is associated with each user 46, 48, . . . , who makes a recording of any given song. Each user object may point to multiple artist pages and songs.

A mashup object 110 is created for each song and each user or combination of users who participate in a given mashup.

A home page 112 provides the basic mode of access by users to the data structures on the Web site maintained by server 22.

A content discovery page 114 is accessed from the home page and enables users to browse or search through the objects available on the Web site.

An artist index 116 provides one component of the content discovery functionality of page 114, by allowing users to browse or search through artist pages 102.

An event index 118 provides the other content discovery component, allowing users to browse or search through event objects 104.

An administrator object 120 (labeled "Audish") enables the operator of server 22 to create and edit event objects 104.

A leader board 122 provides a ranking of the user-created mashups in each event based on popularity and editorial decisions.

Although the figures and description above refer, by way of illustration, to music videos and to a particular Web-based implementation, the methods of media synchronization and mixing that are described herein may similarly be used in other sorts of media distribution and recording applications. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for media processing, comprising:
providing a source media clip, comprising at least source audio data, via a network to a client device;
receiving via the network from the client device a media recording comprising client video and client audio data recorded by a user of the client device while playing the source audio data;
synchronizing the received media recording with the source media clip, wherein synchronizing the received media recording comprises detecting a residual of the source audio data in the received media recording, and aligning the client audio data with the source audio data using the detected residual;
mixing the synchronized media recording with the source media clip to generate a mixed media clip, wherein mixing the synchronized media recording comprises canceling the residual of the source audio data from the mixed media clip by estimating a distortion of the residual relative to the source audio data, and correcting the client audio data using the estimated distortion; and
transmitting the mixed media clip to client devices over the network for playback by users of the client devices.

2. The method according to claim 1, wherein the source media clip comprises music, and wherein the user sings along with the music in the media recording.

3. The method according to claim 2, wherein the music in the source media clip comprises a source music video in which a performer sings a song, and wherein mixing the synchronized media comprises generating a mixed music video in which the song is sung by both the performer and the user.

4. The method according to claim 3, wherein generating the mixed music video comprises mixing multiple media recordings, received respectively from multiple different users, with the source music video so that the mixed music video comprises segments including the multiple different users.

5. The method according to claim 4, wherein mixing the multiple media recordings comprises receiving an input over the network from one of the client devices indicating a selection of one or more of the users for inclusion in the mixed music video, and generating the mixed music video for transmission to the one of the client devices responsively to the selection.

6. The method according to claim 1, wherein providing the source media clip comprises incorporating at least one Barker audio sequence in the source media clip, and wherein synchronizing the received media recording comprises detecting the at least one Barker audio sequence in the received media recording, and aligning the client audio data with the source audio data using the at least one detected Barker audio sequence.

7. Apparatus for media processing, comprising:
a memory, which is configured to hold a source media clip, comprising at least source audio data; and
a processor, which is configured to transmit the source media clip via a network to a client device, to receive via the network from the client device a media recording comprising client video and client audio data recorded by a user of the client device while playing the source audio data, to synchronize the received media recording with the source media clip by detecting a residual of the source audio data in the received media recording, and aligning the client audio data with the source audio data using the detected residual, to mix the synchronized media recording with the source media clip to generate a mixed media clip, and to transmit the mixed media clip to client devices over the network for playback by users of the client devices,
wherein the processor is configured to cancel the residual of the source audio data from the mixed media clip by estimating a distortion of the residual relative to the source audio data, and correcting the client audio data using the estimated distortion.

8. The apparatus according to claim 7, wherein the source media clip comprises music, and wherein the user sings along with the music in the media recording.

9. The apparatus according to claim 8, wherein the music in the source media clip comprises a source music video in which a performer sings a song, and wherein the mixed media clip generated by the processor comprises a mixed music video in which the song is sung by both the performer and the user.

10. The apparatus according to claim 9, wherein the processor is configured to synchronize and mix multiple media recordings, received respectively from multiple different users, with the source music video so that the mixed music video comprises segments including the multiple different users.

11. The apparatus according to claim 7, wherein at least one Barker audio sequence is inserted in the source media clip, and wherein the processor is configured to synchronize the received media recording by detecting the at least one Barker audio sequence in the received media recording, and aligning the client audio data with the source audio data using the at least one detected Barker audio sequence.

12. The apparatus according to claim 11, wherein the processor is configured to receive an input over the network from one of the client devices indicating a selection of one or more of the users for inclusion in the mixed music video, and to generate the mixed music video for transmission to the one of the client devices responsively to the selection.

13. A computer software product, comprising a non-transitory computer-readable medium in which program instructions are stored, which instructions, when read by a computer, cause the computer to provide a source media clip, comprising at least source audio data, via a network to a client device, to receive via the network from the client device a media recording comprising client video and client audio data recorded by a user of the client device while playing the source audio data, to synchronize the received media recording with the source media clip by detecting a residual of the source audio data in the received media recording, and aligning the client audio data with the source audio data using the detected residual, to mix the synchronized media recording with the source media clip to generate a mixed media clip, and to transmit the mixed media clip to client devices over the network for playback by users of the client devices,
wherein the instructions cause the computer to cancel the residual of the source audio data from the mixed media clip by estimating a distortion of the residual relative to the source audio data, and correcting the client audio data using the estimated distortion.

* * * * *